(No Model.)
R. COON & D. D. HAHN.
CAR COUPLING.
No. 301,046. Patented June 24, 1884.
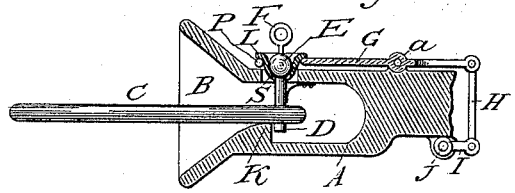
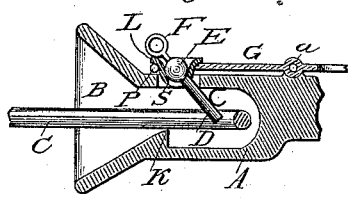
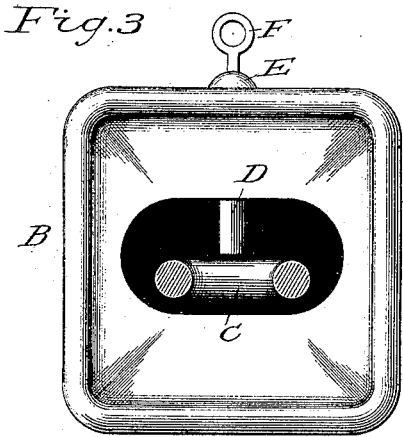
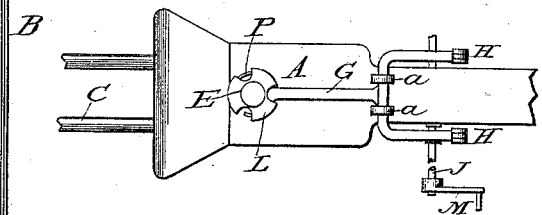
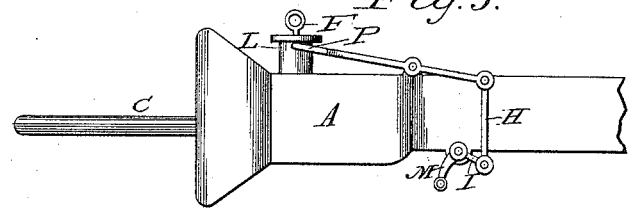
Witnesses:
L. E. Redstone
Albert E. Redstone
Inventors.
Roscoe Coon,
David Dean Hahn.
By John H. Redstone
Atty. in Fact

UNITED STATES PATENT OFFICE.

ROSCOE COON AND DAVID DEANE HAHN, OF SAN FRANCISCO, CALIFORNIA.

CAR-COUPLING.

SPECIFICATION forming part of Letters Patent No. 301,046, dated June 24, 1884.

Application filed October 18, 1883. (No model.)

*To all whom it may concern:*

Be it known that we, ROSCOE COON and DAVID DEANE HAHN, both citizens of the United States, residing in the city and county of San Francisco, and State of California, have invented a new and useful Improvement in Car-Coupling Machines, of which the following is a specification.

Our invention relates to that class of car-couplings where the coupling-pin is used with the ordinary link. It will be readily understood by reference to the accompanying drawings and the letters marked thereon.

Figure 1 is a longitudinal section, showing the interior construction of the draw-head A and the manner of connecting and operating the coupling, the pin D being in position to hold the link S when coupled. Fig. 2 is a longitudinal section showing the coupling-pin D thrown back by the link C and dropping into the loop. Fig. 3 is a front view showing the opening or interior B and the pin D, (and link C in section,) also the bolt or pin ring F and ball E. Fig. 4 is a plan view of the draw-head, showing the connection of the different attachments, part of the coupling-pin ball-socket broken off to show the yoke P of the lever G. Fig. 5 is a side elevation of the same, showing the pin and socket lifted out by the drawing back of the hand-lever M.

The following is the construction of the same: We form the draw-head of any well-known construction, with the projection K to form a stop for the coupling-pin D. We form the coupling-pin with the ball E to operate in the socket L and form the ball-and-socket joint. The ring F is merely designed for handling the pin D and taking it entirely out. C is a link such as is commonly used for coupling freight-cars. The lever G is designed to lift the socket L out, lifting the pin out with the ball E. The socket L has a slot in the lower part, to allow the pin D to move back in the position shown in Fig. 2. We also form the socket L with a flange or rim on the upper edge, to serve as a stop for the yoke P of the lever G. We pivot the lever G at *a a*, and connect with the lever I by means of the connecting-rod H, which is upon the shaft J, upon which the crank-handle M is attached.

The principal objects sought to be attained by us are the certainty of coupling automatically and the safety and convenience of uncoupling from the side of the platform of the car.

The following is the operation of the same: As the cars are moved together the link C, passing into the bumper, strikes the bolt D, and the socket-ball E allows the same to swing back in the position shown in Fig. 2 until the link C passes under the end of the bolt and the bolt drops down and forward to the abutment K, and as the link is drawn forward it is held firmly, thus thoroughly coupling the cars by a connection similar to that of the ordinary freight-car. In uncoupling, the rod J (shown broken in Fig. 4) extends to the sides of the platform of the car, and by operating the crank-handle M (shown in Figs. 4 and 6,) the lever G is operated by means of the connecting-rod H, (shown in Figs. 1, 4, and 6) and the yoke P raises the socket L, lifting the bolt entirely out of or above the link, and allowing the link to pass out of the draw-head freely.

Having thus described our invention, what we claim, and desire to secure by Letters Patent, is—

In car-couplings, the pin D, with ball E, in combination with the lever G, connecting-rods H, lever I, crank M, and rod J, constructed and operated substantially as and for the purposes set forth.

ROSCOE COON.
DAVID DEANE HAHN.

Witnesses:
JAMES MASON,
E. H. THARP.